M. M. Clark.
Milk Cooler.
N°46,640. Patented Mar. 7, 1865.

Witnesses:
Jacl P Brooke
John D. Bloor

UNITED STATES PATENT OFFICE.

MOSES M. CLARK, OF MONROE, NEW YORK.

IMPROVED CAN FOR PRESERVING AND TRANSPORTING MILK.

Specification forming part of Letters Patent No. 46,640, dated March 7, 1865.

*To all whom it may concern:*

Be it known that I, MOSES M. CLARK, of Monroe, Orange county, and State of New York, have invented a new and useful Method of Preserving Milk in Cans; that the title to such cans as given by me is "Clark's Milk-Preserver;" and I do hereby declare that the following is a full, clear, and exact description of the construction and operation of the same, reference being had to the annexed drawings, making a part of this specification.

Figure 4:
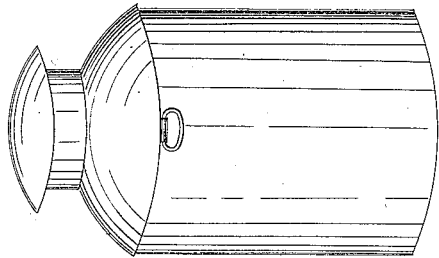
Figure 1:
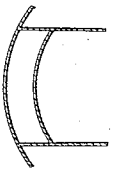
Figure 2:
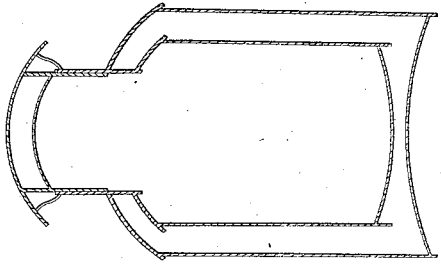
Figure 3:
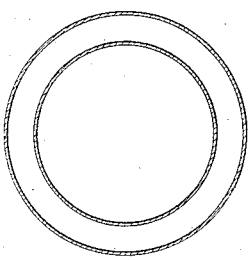

Figure 1 represents the cover of the can, and the space shown on the design of such cover is to be filled in with pulverized charcoal and closed up, as shown upon the drawings. Fig. 2 represents the can in its sectional form, there being an inner and outer can or lining, and the space between them being filled in with pulverized charcoal. Fig. 3 represents the bottom of the can as open, the design, however, being, as soon as the can is filled in with pulverized charcoal, to close up the said bottom in a secure and permanent manner. Fig. 4 represents the can as completely finished.

The design of the said invention is to manufacture cans for milk, to be filled in all around with pulverized charcoal, as shown on the said drawings.

The invention I claim is—

The filling in of milk-cans between the inner and outer covers with pulverized charcoal, as a means of preserving milk, in such a manner as to protect the milk from heat.

New York, February 7, 1865.

MOSES M. CLARK.

Witnesses:
  DAVID MCADAM.
  M. E. CLARK.